(12) United States Patent
Koestner et al.

(10) Patent No.: US 7,385,919 B2
(45) Date of Patent: Jun. 10, 2008

(54) LOCAL NETWORK, PARTICULARLY ETHERNET NETWORK HAVING REDUNDANCY PROPERTIES, AND COUPLING DEVICE FOR SUCH A NETWORK

(75) Inventors: Michael Koestner, Karlsruhe (DE); Harald Thrum, Stutensee (DE)

(73) Assignee: Siemens Aktiengesellschaft, Munich (DE)

( * ) Notice: Subject to any disclaimer, the term of this patent is extended or adjusted under 35 U.S.C. 154(b) by 837 days.

(21) Appl. No.: 10/923,118

(22) Filed: Aug. 23, 2004

(65) Prior Publication Data

US 2005/0111372 A1 May 26, 2005

Related U.S. Application Data

(63) Continuation of application No. PCT/DE03/00553, filed on Feb. 21, 2003, and a continuation of application No. PCT/DE03/00555, filed on Feb. 21, 2003.

(30) Foreign Application Priority Data

Feb. 22, 2002 (DE) ................... 102 07 527
Feb. 22, 2002 (DE) ................... 102 07 529

(51) Int. Cl.
*G01R 31/08* (2006.01)
(52) U.S. Cl. .............. 370/222; 370/244; 370/247; 370/250
(58) Field of Classification Search ........... 370/222, 370/244, 247, 250, 251

See application file for complete search history.

(56) References Cited

U.S. PATENT DOCUMENTS 6,308,282 B1 10/2001 Huang et al.

(Continued)

FOREIGN PATENT DOCUMENTS

CH 688 215 A5 6/1997

(Continued)

OTHER PUBLICATIONS

Fault Tolerant Multiwavelength Optical Rings with Limited Wavelength Conversion: Gerstel, Ornan & Ramaswami, Rajiv; IEEE Journal on selected areas in communications, vol. 16, No. 7, Sep. 1998.*

(Continued)

*Primary Examiner*—Edan Orgad
*Assistant Examiner*—Jay P. Patel
(74) *Attorney, Agent, or Firm*—Sughrue Mion, PLLC

(57) ABSTRACT

A local network, particularly an Ethernet network having redundancy properties, in which coupling devices (K1, K2, K3) and a redundancy manager (RM) are interconnected in a ring-shaped topology. The redundancy manager opens the ring to create a linear topology if test messages (T11, T12) emitted by the redundancy manager (RM) are received at the other port (P42, P41) within a given period of time, otherwise the redundancy manager (RM) closes the connection. As a so-called redundancy manager observer, at least one of the coupling devices (K3) is configured such that it evaluates messages received at the port (P32) thereof, the port (P32) being connected to the redundancy manager, opens the ring to create a linear topology, and signals an error if more than initial test messages (T11) have been received at this port (P32) and if the status "ring opened" has been indicated by the redundancy manager (RM) in the last-received initial test message (T11), whereby messages are prevented from circulating on the ring.

14 Claims, 1 Drawing Sheet

U.S. PATENT DOCUMENTS

| | | |
|---|---|---|
| 6,430,151 B1 | 8/2002 | Glas et al. |
| 6,834,139 B1 * | 12/2004 | Prairie et al. .................. 385/24 |
| 6,940,821 B1 * | 9/2005 | Wei et al. .................... 370/244 |
| 7,076,163 B2 * | 7/2006 | Kinoshita et al. .............. 398/19 |
| 7,242,859 B1 * | 7/2007 | Dasika et al. ................... 398/3 |
| 7,272,307 B2 * | 9/2007 | Fang .............................. 398/4 |
| 7,280,470 B2 * | 10/2007 | Shiragaki et al. ........... 370/223 |
| 7,283,740 B2 * | 10/2007 | Kinoshita et al. ............... 398/5 |
| 7,307,946 B2 * | 12/2007 | Okuno ....................... 370/222 |
| 7,307,947 B2 * | 12/2007 | Okuno ....................... 370/222 |
| 2001/0038608 A1 * | 11/2001 | De Girolamo et al. ..... 370/223 |
| 2003/0055900 A1 | 3/2003 | Glas et al. |

FOREIGN PATENT DOCUMENTS

| | | |
|---|---|---|
| DE | 100 04 432 A1 | 8/2001 |
| DE | 100 47 923 A1 | 5/2002 |
| EP | 0 403 763 A2 | 12/1990 |
| WO | WO 99/46908 A1 | 9/1999 |

OTHER PUBLICATIONS

Topology Update in Fault Tolerant Multiconnected Ring Networks: R.Hartmann and R.Rom.*

* cited by examiner

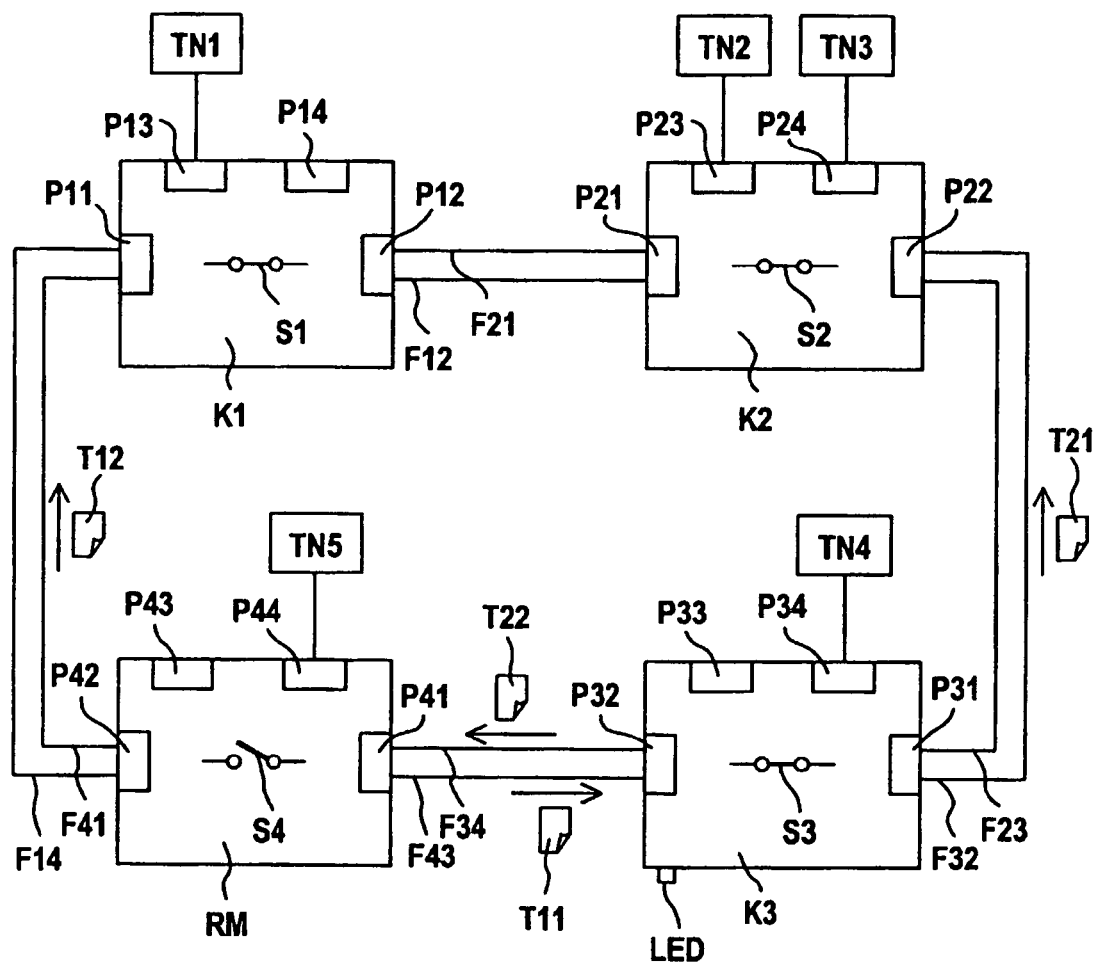

LOCAL NETWORK, PARTICULARLY ETHERNET NETWORK HAVING REDUNDANCY PROPERTIES, AND COUPLING DEVICE FOR SUCH A NETWORK

CROSS-REFERENCE TO RELATED APPLICATIONS

This is a Continuation of International Applications PCT/DE03/00553 and PCT/DE03/00555 both with an international filing date of Feb. 21, 2003, which were both published under PCT Article 21(2) in German, and the disclosures of which are incorporated into this application by reference.

FIELD OF AND BACKGROUND OF THE INVENTION

The present invention is related to a local network, particularly an Ethernet network, having redundancy properties and a coupling device for such a network.

A local Ethernet network with redundancy properties is known from WO 99/46908. In the network described therein, coupling devices and a redundancy manager, each having at least two ports and being configured as layer 2 components, are interconnected in a ring-shaped topology by connecting two ports of adjacent devices. The term "layer 2 components" means that at least the layers 1 and 2 of the ISO OSI 7-layer model are implemented in the devices. The devices thus perform an address evaluation and message routing. In normal operation, i.e., if no errors have occurred in the network, the redundancy manager opens the ring. This means that messages received by the redundancy manager at its one port located in the ring are not forwarded via its other port located in the ring, but are blocked. This status is symbolized by an open switch. Thus, logically, the network has a linear topology in which the two line ends of the network are connected to a redundancy manager, which in the error-free case separates the two line ends from one another. In the event of an error, i.e., if an interruption occurs at some point in the network outside the redundancy manager, the redundancy manager connects the two line ends to again form a linear topology.

Physically, however, this is a ring-shaped network topology in which the devices form a ring by connecting two ports of adjacent devices. The redundancy manager ensures that at any given time the ring is interrupted only at a single location. To check whether there is already an interruption of the ring outside the redundancy manager, i.e., to check whether the network is operating error free, the redundancy manager sends test messages into the ring at defined time intervals via the two ports with which it is connected to the ring, and it opens the ring to form a linear topology with respect to the transmission logic if the test messages are received at its other port within an additional predefined time interval. Otherwise, i.e., if at least one test message has been received at the other port within the additional time interval, the redundancy manager closes the connection, such that the network has again a logically linear topology consisting of a continuous line. With respect to further embodiments and advantages of such a local network and a redundancy manager, reference is made to the above-cited publication WO 99/46908.

Networks in which messages are distributed from node to node and in which the response to the failure of a communication link between two nodes is to add a redundant communication path, have the risk that messages are copied or circulate within the network. Such errors can be triggered when a redundant communication path is mistakenly added. Thus, as a result of a malfunction of the conventional redundancy manager, the two line ends could inadvertently be connected and a logically ring-shaped network topology could be created. As a result, messages can circulate within the ring. In the worst case, the maximum bandwidth of the network available for the data traffic is occupied, such that further payload traffic among the users connected to the network can no longer be transmitted. When such an error occurs, the network is not available, or at least not fully available, for the connected users.

SUMMARY OF THE INVENTION

One object of the invention is to provide a local network, particularly an Ethernet network having redundancy properties, which is distinguished by an increased availability of the network for the transmission of payload data of the connected users. A further object is to provide a coupling device to attain this object in a network.

To attain these objects, in accordance with a first exemplary embodiment a local network, preferably an Ethernet network with redundancy properties, is proposed that includes at least two coupling devices and a redundancy manager, each of which has at least two ports and wherein the coupling devices and the redundancy manager are configured as layer 2 components with respect to the ISO OSI 7-layer model and are interconnected in a ring by a connection of two ports of respective adjacent devices. Additionally the redundancy manager is configured to send initial test messages into the ring at predefined intervals via two of the at least two ports of the redundancy manager with which it is connected to the ring and if the initial test messages sent by each one of the two ports are received by the other one of the two ports of the redundancy manager within a predefined time interval, to open the ring to create a linear topology and otherwise to close the connection. Further, in accordance with the present embodiment, the redundancy manager is configured to indicate a corresponding ring opened or connection closed status in the initial test messages and at least one of the other coupling devices adjacent to the redundancy manager in the ring is configured as a redundancy manager observer to evaluate messages that it receives at one of its ports which is connected to the redundancy manager and to open the ring to create a linear topology if more than only the initial test messages have been received at the one port and the redundancy manager has indicated the ring opened status in the immediately preceding received initial test message.

According to a further exemplary embodiment, a local network, preferably an Ethernet network with redundancy properties, is provided that includes at least two coupling devices and a redundancy manager, each of which has at least two ports and wherein the coupling devices and the redundancy manager are configured as layer 2 components with respect to the ISO OSI 7-layer model and are interconnected in a ring by a connection of two ports of respective adjacent devices. Additionally, the redundancy manager is configured to send initial test messages into the ring at predefined intervals via two of the at least two ports of the redundancy manager with which it is connected to the ring and if the initial test messages sent by each one of the two ports are received by the other one of the two ports of the redundancy manager within a predefined time interval, to open the ring to create a linear topology and otherwise to close the connection.

Also, in accordance with the present exemplary embodiment, at least one of the coupling devices is configured as a redundancy manager observer to send second test messages into the ring at predefined time intervals via two of its at least two ports by which it is connected to the ring in order to monitor the redundancy manager and to open the ring to create a linear topology if the second test messages are received at the other of the two respective ports within a predefined time interval and otherwise to close the connection between the ports.

The present invention is further defined by a coupling device consistent with the coupling devices included in the above-described two exemplary embodiments.

The invention has the advantage that the monitoring for the correct functioning of the redundancy manager is independent of the redundancy manager. Thus, errors within the redundancy manager cannot interfere with the monitoring or make it impossible. Any accidental closing of the network connection by the redundancy manager is quickly detected by the so-called redundancy manager observer by means of its own test messages, which the redundancy manager observer sends out and evaluates. Any errors that occur are corrected by opening the ring without relatively long delays. This increases the availability of the local network. In addition, any errors during startup, e.g., an incorrect configuration of the redundancy manager, are detected.

A signaling of such an error by the redundancy manager observer has the advantage that suitable error correction measures can be taken, e.g., the redundancy manager can be repaired or replaced. In addition, any errors during startup, e.g., an incorrect configuration of the redundancy manager, are detected.

The monitoring principle has the advantage of managing without additional test messages that burden the network. In the initial test messages, the redundancy manager indicates the corresponding status, "ring opened" or "connection closed", and a coupling device, which is adjacent to the redundancy manager in the ring, opens the ring if more than only initial test messages are received at the port to which the redundancy manager is connected and the redundancy manager has indicated the status "ring opened" in the last receipt of the initial test messages.

This monitoring principle can advantageously be supplemented by the monitoring of the redundancy manager by the redundancy manager observer using its own second test messages to further reduce the failure probability of the network.

In the normal case, i.e., in error-free operation, the redundancy manager observer transparently forwards initial test messages of the redundancy manager and takes second test messages, which the redundancy manager observer has fed into the ring, off the ring when it receives them, i.e., it does not forward them. Correspondingly, the redundancy manager transparently forwards second test messages if the redundancy manager has closed the connection. The redundancy manager blocks second test massages, however, i.e., it does not forward them, if the redundancy manager has opened the ring. Configuring the second test messages differently from the initial test messages has the advantage that these functions of the redundancy manager and the redundancy manager observer can be correspondingly executed immediately after the respective message type has been detected. This eliminates the need for a complex matching of the instants of transmission of the initial and the second, test messages between the redundancy manager and the redundancy manager observer and a distinction based on the time position of the test messages, which could be an alternative to the distinction by message types based on the messages themselves.

Advantageously, the failure probability is further reduced if all the coupling devices interconnected in the ring-shaped topology are configured as redundancy manager observers. This also ensures a monitoring of the functioning of a redundancy manager observer by the other redundancy manager observers. For this purpose, the redundancy manager observers can use a protocol among each other to determine the valid network topology. In the simplest case, however, an exchange of synchronization messages among the redundancy manager observers is sufficient.

A further monitoring principle, which moreover has the advantage of managing without additional test messages that burden the network, is that the redundancy manager indicates the corresponding status "ring opened" or "connection closed" in the initial test messages and that a coupling device, which is adjacent to the redundancy manager in the ring, opens the ring if more than only initial test messages are received at the port to which the redundancy manager is connected and the redundancy manager has indicated the status "ring opened" in the last received of the initial test messages. This monitoring principle advantageously supplements the monitoring of the redundancy manager by the redundancy manager observer with its own second test messages and thus further reduces the failure probability of the network.

BRIEF DESCRIPTION OF THE DRAWINGS

The invention and its embodiments and advantages will now be explained in greater detail with reference to the drawing, which depicts an exemplary embodiment of the invention.

DETAILED DESCRIPTION OF THE PREFERRED EMBODIMENTS

In a network, four coupling devices K1, K2, K3 and RM are interconnected, and the coupling device RM is operated as a redundancy manager. The coupling devices each have four ports, P11-P14, P21-P24, P31-P34 and P41-P44, respectively, to which connecting lines for the reception and transmission of messages can be connected. The coupling devices K1 to K3 and RM are configured as layer 2 components, i.e., they route messages in accordance with an internally stored address table. They are interconnected into a ring-shaped topology such that two ports of adjacent devices are connected. For this purpose, the ports P12 and P21 are interconnected by fibers F12 and F21 of a glass fiber cable. Copper cable can of course be used as an alternative. The fiber F12 serves to transmit messages from port P12 of the coupling device K1 to the port P21 of the coupling device K2. In the opposite direction, messages are transmitted from the port P21 of the coupling device K2 to the port P12 of the coupling device K1 via the fiber F21. Accordingly, so-called full duplex transmission is possible, in which messages can be simultaneously transmitted in both directions. Correspondingly, the ports P22 and P31 are interconnected by fibers F23 and F32, the ports P32 and P41 by fibers F34 and F43 and the ports P42 and P1 by fibers F41 and F14. A user TN1 is connected to the port P13 of the coupling device K1, a user TN2 to the port P23 of the coupling device K2, a user TN3 to the port P24 of the coupling device K2, a user TN4 to the port P34 of the coupling device K3 and a user TN5 to the port P44 of the coupling device RM. These users can be, for example, automation devices, control and monitoring stations, servers, printers, other network segments, etc.

Logically, during error-free operation, the network is a local network with a linear topology, since the ring is interrupted at the coupling device RM, which is operated as the redundancy manager. This interruption is indicated by a switch S4. Corresponding switches S1, S2 and S3 in the coupling devices K1, K2 and K3 are closed. A closed switch S1 of the coupling device K1, for example, means that the messages to be switched through by the coupling device K1 in the line are transparently switched from the receive port, e.g., the port P11, to the send port, e.g., the port P12. The same is true in the opposite direction.

In the event of an error, i.e., if the depicted line is interrupted, the redundancy manager connects the two line ends together, i.e., it forwards the messages received at the port P41 via the port P42 and, vice versa, if they must be switched through and are not addressed to the user TN5. This corresponds to a switch S4 in closed position. To monitor the line for possible interruptions, the redundancy manager RM sends initial test messages T11 and T12 into the ring at first predefined intervals via the two ports P41 and P42 with which it is connected to the ring. If these initial messages T11 and T12 are received at the other port P42 or P41 within a second predefined time interval, the line is not interrupted and the ring is opened to create or—depending on the previous status—maintain a linear topology, i.e., the switch S4 is, or remains, opened.

If the initial test messages T11 or T12 are not received at the other port P42 or P41 within the second time interval, an error is present and the line is interrupted. The error is thus detected and the switch S4 is closed, such that a functioning line is restored and communication continues to be ensured. When defining the first and second time intervals, the maximum circulation time of messages within the network and the maximum allowable reconfiguration time must be taken into account. If the time intervals are suitably selected this reconfiguration of the network is comparatively fast, which ensures that the connected users do not dismantle any logic communication connections, that communication continues without interruptions and that any automation solution realized by means of the network remains unaffected.

If the redundancy manager RM closed the switch S4 due to an internal error without an interruption having occurred in the rest of the ring, then circulating messages could be created in the ring. This would be the case, for example, if the software of the redundancy manager RM incorrectly switched messages through because of a software or logic error even though there was no interruption in the rest of the ring. Such errors could affect the availability of the network. To prevent this, the coupling device K3, for example, is operated as a so-called redundancy manager observer. All the coupling devices in the embodiment shown, including the coupling devices K1 and K2 could be operated analogously. However, the description with reference to the coupling device K3 is sufficient to explain the invention.

To monitor the redundancy manager RM, the coupling device K3 also sends second test messages T21 and T22 at defined third intervals into the ring via the ports P31 and P32. If the two test messages T21 and T22 do not reach the other port P32 or P31 of the coupling device K3 within a fourth defined time interval, then there is an interruption in the remaining part of the ring. The switch S3 remains closed. If the redundancy manager RM incorrectly closes the ring, the second test messages T21 and T22 reach the port P32 or P31. As a result, a short circuit of the ring would be detected. In this case the coupling device K3 opens the switch S3 to again form a logically linear network topology overall. The third and fourth time interval can be determined analogously to the selection of the first and the second time interval. After a short reconfiguration time the network is again ready for operation.

As described above, the coupling devices K1 and K2 can analogously perform the above-described function of a redundancy manager. This has the advantage that any errors of the coupling device K3 are also detected. The coupling device K3 signals a detected error of the redundancy manager RM by a light emitting diode LED. In response, suitable error correction measures can be introduced. Another means to signal an error is, for example, to send an error message to a central network management station.

The described monitoring of the redundancy manager by a redundancy manager observer also makes it possible to detect errors where the software of the redundancy manager RM detects an error-free operation of the rest of the ring but the hardware of the redundancy manager RM is not behaving properly and incorrectly closes the switch S4. If there are no clear indicators for such errors in the redundancy manager RM itself, the redundancy manager cannot detect the error. Such an error is difficult to avoid completely because even a single bit-error in the complex hardware circuit of the redundancy manager RM, which the switch S4 represents here in simplified form, could already lead to such an error. Such errors can be quickly detected using the following type of monitoring.

It is assumed here that the redundancy manager RM indicates the corresponding status in the test messages T11 and T12, for example, "ring opened" or "connection closed." The coupling device K3, which is configured as a redundancy manager observer, evaluates the messages received at its port P32, which connects it directly to the redundancy manager RM. A malfunction of the redundancy manager RM is present if the status "ring opened" is indicated in the test messages T11 and other messages besides the test messages T11 are received at the port P32. If those two conditions are met, the coupling device K3 opens its switch S3 and signals an error of the redundancy manager RM with its light emitting diode LED. When one of the two conditions is no longer met, the coupling device K3 closes its switch S3 again. This makes it possible to check the function of the redundancy manager RM without burdening the network with additional test messages of a redundancy manager observer. In addition, a rapid detection of such errors and a rapid network reconfiguration are achieved.

The redundancy manager observer (coupling device K3) checks the decision of the redundancy manager RM to close the ring by sending two messages T21 and T22. When the redundancy manager observer has received the information from the redundancy manager RM that the latter has closed the ring, but the redundancy manager observer itself receives the second test messages it has sent from its one ring port, e.g., the port P31, at its other ring port, here the port P32, then the redundancy manager observer assumes that the redundancy manager has incorrectly closed the switch S4. In response, the redundancy manager observer (coupling device K3) opens the ring with its switch S3 and signals the malfunction of the redundancy manager.

The above description of the exemplary embodiment has been given by way of example. From the disclosure given, those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalents thereof.

What is claimed is:

1. A local network comprising:
at least two coupling devices and a redundancy manager, each of which comprises at least two ports,
wherein the coupling devices and the redundancy manager are configured as layer 2 components with respect to an ISO OSI 7-layer model and are interconnected in a ring by a connection of two ports of respective adjacent devices, and
wherein further, the redundancy manager is configured to send initial test messages into the ring at predefined intervals via two of the at least two ports of the redundancy manager with which it is connected to the ring and if the initial test messages sent by each one of the two ports are received by the other one of the two ports of the redundancy manager within a predefined time interval, to open the ring to create a linear topology and otherwise to close the connection, and
wherein further, the redundancy manager is configured to indicate a corresponding ring opened or connection closed status in the initial test messages and at least one of the other coupling devices adjacent to the redundancy manager in the ring is configured as a redundancy manager observer to evaluate messages that it receives at one of its ports which is connected to the redundancy manager and to open the ring to create a linear topology if more than only the initial test messages have been received at the one port and the redundancy manager has indicated the ring opened status in an immediately preceding received initial test message.

2. A local network as claimed in claim 1, wherein the redundancy manager observer is further configured to generate an error signal if conditions for opening the ring are met.

3. A local network as claimed in claim 1, wherein at least a first coupling device is configured to send second test messages to monitor the redundancy manager into the ring at predefined time intervals via two respective ports of the first coupling device with which it is connected to the ring and to open the ring to create a linear topology if the second test messages sent by each of the two respective ports of the first coupling device are received at the other of the two respective ports of the first coupling device within a predefined time interval, and otherwise to close the connection between the two respective ports.

4. A local network as claimed in claim 3, wherein the first coupling device is configured to signal an error of the redundancy manager if a second test message is received.

5. A local network as claimed in claim 3, wherein the second test messages differ from the initial test messages.

6. A coupling device used in the local network claimed in claim 1, wherein the coupling device is configured as the redundancy manager observer.

7. A local network as claimed in claim 1, wherein the local network is an Ethernet network with redundancy properties.

8. A local network comprising:
at least two coupling devices and a redundancy manager, each of which comprises at least two ports,
wherein the coupling devices and the redundancy manager are configured as layer 2 components with respect to an ISO OSI 7-layer model and are interconnected in a ring by a connection of two ports of respective adjacent devices, and
wherein further, the redundancy manager is configured to send initial test messages into the ring at predefined intervals via two of the at least two ports of the redundancy manager with which it is connected to the ring and if the initial test messages sent by each one of the two ports are received by the other one of the two ports of the redundancy manager within a predefined time interval, to open the ring to create a linear topology and otherwise to close the connection, and
wherein further, at least one of the coupling devices is configured as a redundancy manager observer to send second test messages into the ring at predefined time intervals via two of its at least two ports by which it is connected to the ring in order to monitor the redundancy manager and to open the ring to create a linear topology if the second test messages are received at the other of the two respective ports within a predefined time interval and otherwise to close the connection between the ports.

9. A local network as claimed in claim 8, wherein the redundancy manager observer is configured to generate an error signal of the redundancy manager if the second test message is received.

10. A local network as claimed in claim 8, wherein the second test messages differ from the initial test messages.

11. A local network as claimed in claim 8, wherein all the coupling devices that are interconnected with the redundancy manager in the ring are configured as redundancy manager observers.

12. A local network as claimed in claim 8, wherein the redundancy manager is configured to indicate the corresponding ring opened or connection closed status in the initial test messages and the redundancy manager observer is adjacent to the redundancy manager in the ring and configured to evaluate any messages which it receives at its respective port connected to the redundancy manager, and to open the ring to create a linear topology and generate an error signal if more than only the initial test messages have been received at this port and the ring opened status has been indicated by the redundancy manager in the immediately preceding received initial test message.

13. A coupling device used in the local network claimed in claim 8, wherein the coupling device is configured as the redundancy manager observer.

14. A local network as claimed in claim 8, wherein the local network is an Ethernet network having redundancy properties.

* * * * *